United States Patent
Andersson

[19]
[11] Patent Number: 6,047,194
[45] Date of Patent: Apr. 4, 2000

[54] METHOD, AND ASSOCIATED APPARATUS, FOR SELECTIVELY PERMITTING TRANSMISSION OF PACKET DATA TO A MOBILE TERMINAL

[75] Inventor: Dick Andersson, Kista, Sweden

[73] Assignee: Telefonaktiebolaget L M Ericsson (publ), Stockholm, Sweden

[21] Appl. No.: 08/936,068

[22] Filed: Sep. 23, 1997

[51] Int. Cl.[7] .................. H04Q 7/20; H04Q 7/22
[52] U.S. Cl. ............... 455/466; 455/466; 455/458; 455/457; 455/433; 455/403; 455/31.3; 455/31.1; 455/31.2; 370/329; 370/349
[58] Field of Search ................... 455/466, 458, 455/457, 433, 403, 31.3, 31.1, 31.2; 370/329, 349

[56] References Cited

U.S. PATENT DOCUMENTS

| | | | |
|---|---|---|---|
| 4,266,098 | 5/1981 | Novak | 179/5.5 |
| 5,327,486 | 7/1994 | Wolff et al. | 379/96 |
| 5,502,725 | 3/1996 | Pohjakallio | 370/94.1 |
| 5,559,860 | 9/1996 | Mizikovsky | 379/58 |
| 5,577,102 | 11/1996 | Koivunen | 379/59 |
| 5,590,133 | 12/1996 | Billström et al. | 370/349 |
| 5,606,595 | 2/1997 | Ejzak | 379/58 |
| 5,621,729 | 4/1997 | Johnson et al. | 370/62 |
| 5,787,357 | 7/1998 | Salin | 455/466 |
| 5,799,154 | 6/1998 | Kuriyan | 395/200.53 |
| 5,872,777 | 2/1999 | Brailean et al. | 370/349 |
| 5,875,403 | 3/1999 | Chrisstal | 455/550 |
| 5,901,142 | 5/1999 | Averbuch et al. | 370/329 |
| 5,915,222 | 6/1999 | Olsson et al. | 455/466 |

FOREIGN PATENT DOCUMENTS

| | | |
|---|---|---|
| 100515 | 6/1999 | European Pat. Off. . |
| WO 97/14262 | 4/1997 | WIPO . |

OTHER PUBLICATIONS

*Short Message Service Based Applications in the GSM Network* by S. Collesei, P. di Tria, G. Morena, XP 000612265; IEEE International Symposium on Personal, Indoor and Mobile Radio Communication, vol. 3, Sep. 18, 1994, pp. 939–943.

*Primary Examiner*—Fan S. Tsang
*Assistant Examiner*—Simon Nguyen
*Attorney, Agent, or Firm*—Jenkens & Gilchrist P.C.

[57] ABSTRACT

A method, and associated apparatus, for the selective transmission of packet data to a mobile terminal operable in a radio communication system. When packet data is to be terminated at the mobile terminal, an SMS (short message service) message is first transmitted to the mobile terminal. A determination is made at the mobile terminal whether to permit transmission of packet data thereto. The packet data is transmitted to the mobile terminal if permission is granted by the mobile terminal.

28 Claims, 3 Drawing Sheets

METHOD, AND ASSOCIATED APPARATUS, FOR SELECTIVELY PERMITTING TRANSMISSION OF PACKET DATA TO A MOBILE TERMINAL

The present invention relates generally to the transmission of packet data in a radio communication system, such as a cellular communication system, which provides for both packet data communication and SMS (short message service) transmission. More particularly, the present invention relates to a method, and associated apparatus, for selectively permitting transmission of packet data to a mobile terminal operable in the radio communication system.

Charges accrue to the mobile terminal for each transmission of packet data thereto. During operation of an embodiment of the present invention, packet data is transmitted to the mobile terminal only with the permission of the mobile terminal. Transmission of undesired, or otherwise unsolicited, packet data is selectably prevented at the mobile terminal by denying permission to transmit the packet data thereto.

The packet data is transmitted to the mobile terminal only if the mobile terminal permits the transmission. An SMS message is first transmitted to the mobile terminal. The SMS message provides the mobile terminal with the identity of the originator of the packet of data. A user of the mobile terminal, once provided with the identity of the originator of the packet of data, selects whether to accept transmission of the packet. If a selection is made not to accept transmission, the packet of data is not sent. Only packet data transmissions permitted by the mobile terminal to be transmitted thereto are transmitted over a radio air interface to the mobile terminal. Thereby, the user of the mobile terminal is able to control which packets of data are transmitted to the mobile terminal. Costs associated with the transmission of the packets of data to the mobile terminal are thereby also able to be controlled.

BACKGROUND OF THE INVENTION

Advancements in communication technologies have permitted significant improvements, both in performance and cost, in the communication of data between a sending and a receiving station. Advancements in the field of radio communications, for instance, have permitted the introduction of, and wide usage of, both improved and new types of radio communication systems.

Digital communication techniques, for example, have been implemented in various radio communication systems. Such implementations have permitted, at times, multi-fold increases in the communication capacities of such communication systems. Cellular communication systems are exemplary of radio communication systems in which digital communication techniques have been widely implemented. When a digital communication technique is utilized, for instance, a single carrier can be used to form more than one channel. The communication capacity of a cellular communication system in which a digital communication technique is implemented typically permits, thereby, a several-fold increase in the communication capacity of the system.

Advancements in communication technologies have also facilitated decentralization of computer systems. Increasingly, computer systems are formed of decentralized, processing devices, distributed at separate locations and connected together by network connections. IP (intelligent peripheral) networks, such as the Internet, are formed of such network-connected, distributed, processing devices. Sending and receiving stations, sometimes referred to as "host devices" or "hosts", transmit and receive packets of data when a packet channel, forming a communication channel therebetween, is available to communicate the packets. The packet channel is shared amongst many users and is used to transmit a particular packet of data when the channel becomes available to do so. Communication of packets of data between the distributed, processing devices permit communication of information between such distributed devices in a cost-efficient manner upon a shared, packet channel.

Merging of technologies have permitted the implementation of radio communication systems in which an IP host device is coupled by way of a radio link to permit Internet, or other packet data, communications with a host device coupled to a conventional, wireline network. For instance, a terminal device, such as a portable computer, can be coupled by way of a radio link to network infrastructure of a radio communication system and, in turn, by way of a network connection to an Internet-connected, host device. The terminal device forms a wireless host to the Internet-connected host device. A physical, such as a hard-wired, link is not formed with the wireless host device. Instead, a packet channel is defined upon the radio link to permit the communication of the packets of data with the wireless host device.

Packet-switched communications advantageously permit several mobile users to share an available channel capacity. Effectuation of communication by way of packet data transmission on a shared, packet channel, is therefore a less expensive manner by which to communicate than by resort to a conventional, circuit-switched communication channel. In communications upon a circuit-switched communication channel, the channel is dedicated for communication between a single sending/receiving station pair. Also, packet-switched communications are particularly amenable for communication of data which is of a "bursty" nature, transmissible in discrete bursts.

Standards have been set forth, and channels allocated, for the communication of packet data in several cellular communication systems, such as the GPRS (generic packet data service) in the GSM (general system for mobile communications) system and the PPDC (packet PDC) in the PDC (personal digital cellular) network in Japan.

Such cellular communication systems also permit SMS (short message service) communications. SMS communications are effectuated upon control channels, also used for control signaling. SMS messages communicated to the mobile terminal are therefore the least-bandwidth costly manner by which to communicate messages to a mobile terminal.

A mobile terminal operable in such systems is operable pursuant to a service subscription. Communications with the mobile terminal are charged to the service subscription. Charges typically accrue to the service subscription for each packet-switched or circuit-switched communication with the mobile terminal. That is to say, the subscriber, typically the user of the mobile terminal, to the service subscription must pay a fee each time in which the mobile terminal is utilized either to send or to receive communications. Such charges accrue both for circuit-switched communications as well as packet-switched communications. Because SMS messages are transmitted upon a signaling channel, charges for communication of such messages are typically not separately itemized.

Because of the unilateral nature of a packet data transmission, unsolicited packets of data might be transmitted to the mobile terminal. Because a charge accrues for each communication to the mobile terminal, the service subscription might be charged for the transmission to the mobile terminal of unsolicited, or otherwise unwanted, packets of data.

A manner by which to prevent, or otherwise filter, the transmission of packets of data to the mobile terminal without the permission of the user of the mobile terminal would prevent the accrual of charges for the transmission of undesired packets of data to the mobile terminal.

It is in light of this background information related to packet data communication systems that the significant improvements of the present invention have evolved.

SUMMARY OF THE INVENTION

The present invention, accordingly, advantageously provides a method, and associated apparatus, for selectively permitting transmission of packet data to a mobile terminal operable in a radio communication system. The mobile terminal is provided with an indication of the originator of the packet data intended to be terminated at the mobile terminal. Selection is made at the mobile terminal whether to permit the transmission of the packet data to the mobile terminal responsive to the indication of the originator of the packet data. A user of the mobile terminal is thereby able to control transmission of packet data to the mobile terminal. Packet data originated at unknown sources, perhaps indicative of an unwanted advertising content of the packet data, can be prevented from being transmitted to the mobile terminal. As charges accrue to the mobile terminal for each transmission of packet data thereto, the user of the mobile terminal is able to prevent charges from accruing for the transmission of unwanted, or otherwise unsolicited, packet data transmissions.

In one aspect of the present invention, the radio communication system comprises a cellular communication system, such as a GSM (general system for mobile communications) or PDC communication system. In such systems, provision is made, in addition to the transmission of circuit-switched data, for packet data communications and also SMS (short message service) messaging. When packet data, originated at an originating source, is to be terminated at the mobile terminal, the packet data is forwarded, such as by way of an Internet backbone, to the network infrastructure of a PLMN (public land mobile network) in which the terminating mobile terminal is operable. The originator of the packet data is determined, such as by analysis of header information of the packet data. An SMS message is formed which identifies the originator of the packet of data which is to be terminated at the mobile terminal. The SMS message is transmitted to the mobile terminal in conventional fashion, e.g., upon a digital signaling channel. The SMS message is displayed at the mobile terminal, thereby to inform a user of the mobile terminal that a packet of data, originated by the originating source, is to be terminated at the mobile terminal. The user of the mobile terminal is, thereafter, able to select whether to accept transmission of the packet of data. If a selection is made not to accept the transmission, the packet of data is not sent. Only if an affirmative selection is made, and thereafter returned to the PLMN infrastructure, is transmission of the packet of data permitted, after the packet channel is established, to the mobile terminal.

Thereby, the user of the mobile terminal is able to control the transmission of packets of data to the mobile terminal. Costs associated with the transmission of the packets of data to the mobile terminal are thereby also able to be controlled by the user of the mobile terminal. Charges accrued for the receipt of unwanted, or otherwise unsolicited, packet data is thereby avoided.

In another aspect of the present invention, packet data which is to be terminated at a mobile terminal operable in a PLMN is received at a GPMSC (gateway packet mobile switching center). The GPMSC is operable, inter alia, to translate a termination IP address which forms a portion of the header information of the packet of data to a mobile serial number identifying a mobile terminal operable in the PLMN. If an MSN is indexed against the IP address, the GPMSC is further operable to search for the registered location of the mobile terminal identified by the MSN.

In another aspect of the present invention, the mobile terminal is operable to receive an SMS message indicating the identity of a originating source which originates packet data which is to be terminated at the mobile terminal. The mobile terminal includes a display element for displaying the identity of the originating source and an actuator, actuatable by a user of the mobile terminal, to generate a return signal back to the infrastructure of the PLMN. The return signal grants permission for the transmission of the packet data to the mobile terminal. Control over the transmission of packet data to the mobile terminal is thereby provided to a user of the mobile terminal. Transmission of unwanted, or otherwise unsolicited, packets of data to the mobile terminal is prevented.

In these and other aspects, therefore, a method, and an associated apparatus, selectively permits transmission of packet data to a mobile receiving station of a radio communication system. The mobile receiving station is coupled by way of a radio interface to network infrastructure of the radio communication system. A sending station is coupled to the network infrastructure, and the radio interface includes a short message channel and a packet channel. Packet data originated by the sending station is detected at the network infrastructure. An identity of the sending station from which the packet data originates is determined at the network infrastructure. An indication of the identity of the sending station is send, by way of the short message channel, to the mobile receiving station. The mobile receiving station detects the indication of the identity of the sending station sent by way of the short message channel. Selection is made, at the mobile receiving station, whether to accept transmission of the packet data originated by the sending station responsive to the indication of the identity of the sending station detected at the mobile receiving station. If selection is made to accept transmission of the packet data at the mobile receiving station, the packet data is sent, by way of the packet channel, to the mobile receiving station.

A more complete appreciation of the present invention and the scope thereof can be obtained from the accompanying drawings which are briefly summarized below, the following detail description of the presently-preferred embodiments of the invention, and the appended claims.

DETAILED DESCRIPTION

Figure 1:
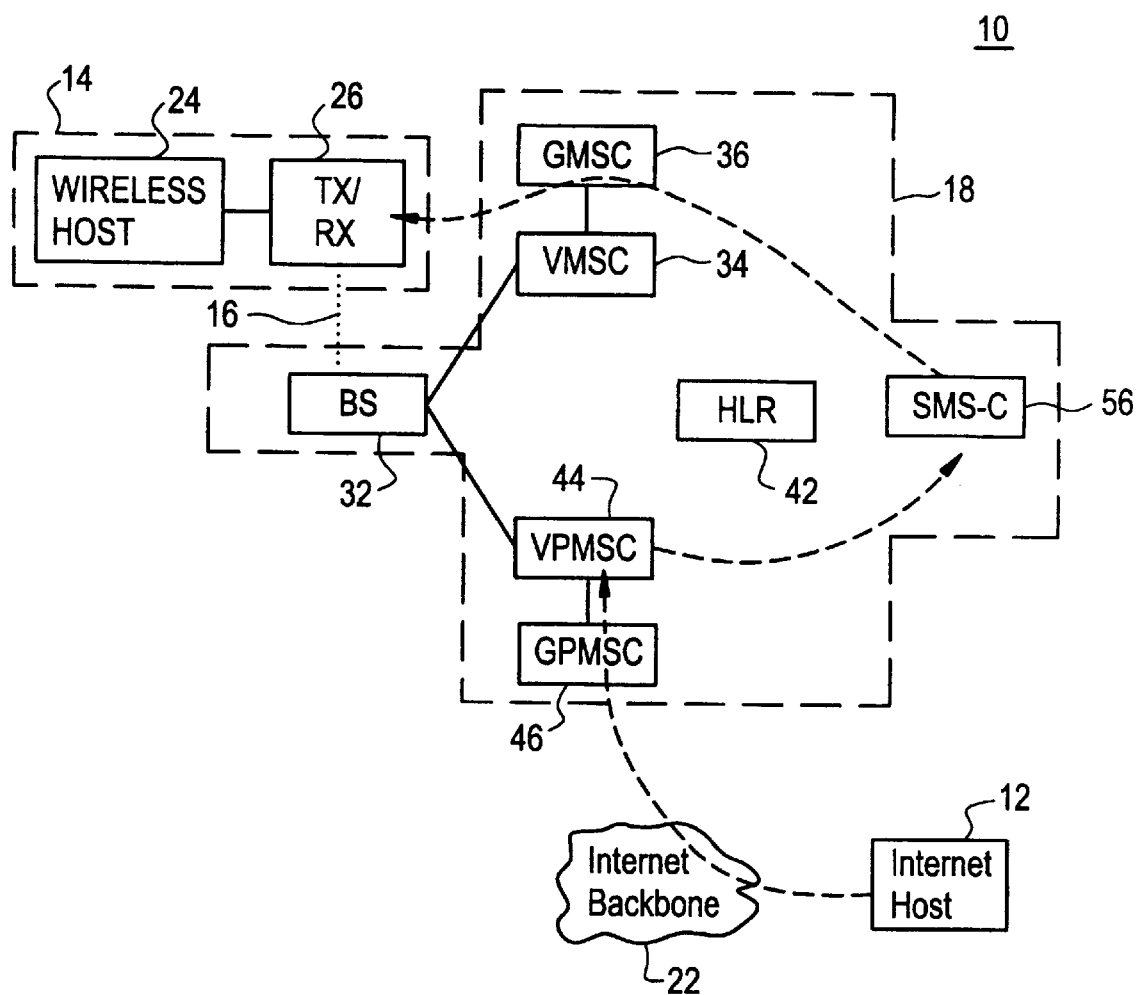
FIG. 1 illustrates a communication system in which an embodiment of the present invention is operable.

Referring first to FIG. 1, a communication system, shown generally at 10, permits the communication of packet data generated by a Internet host 12 to be communicated to a mobile terminal 14. The mobile terminal is coupled by way of a radio link, here identified by the line 16, shown in dash, extending between the mobile terminal 14 and a PLMN (public land mobile network) 18.

The PLMN 18, in turn, is coupled by way of an Internet backbone 22 to which the Internet host 12 is coupled.

In the illustrated embodiment, the mobile terminal 14 includes a wireless host 24 and a radio transceiver 26. The wireless host 24 is coupled to the radio transceiver 26, e.g., by way of a hard-wired or infrared connection. The radio transceiver is constructed to be operable pursuant to a radio air interface standard, such as the RCR 27-STD (air interface standard for the PDC system), EIA/TIA IS-54, or IS-136 Standard. In other embodiments, the wireless host 24 and radio transceiver 26 form a single unit.

The PLMN 18 is correspondingly constructed to comply with operational requirements of a selected air interface standard, such as one of the aforementioned radio air interface standards.

The PLMN 18 is here shown to include a radio base station 32. The base station 32 includes transceiver circuitry permitting transmission and reception of communication signals with the radio transceiver 26 of the wireless station 14. The base station 32 and the radio transceiver 26 are both capable of communicating both circuit-switched data and packet-switched data. The base station is coupled to an MSC (mobile switching center) 34, here a VMSC (visited mobile switching center). The VMSC 34 is here shown to be coupled, in turn, to another MSC, here a GMSC (gateway mobile switching center) 36.

An HLR (home location register) is further coupled to the VMSC 34. While the HLR 42 is shown to be functionally separate from the VMSC 34, the HLR 42 may physically be co-located with the VMSC 34.

Analogously, the base station 32 is further coupled to a PMSC (packet mobile switching center), here a VPMSC (visited-location packet mobile switching center) 44. The VPMSC 44 is, in turn, coupled to another PMSC, here a GPMSC (gateway packet mobile switching center) 46. And, the VPMSC 44 is further coupled to the HLR 42.

While not separately shown, the HLR 42 is further coupled to other network nodes, i.e., other MSCs and PMSCs, such as the GMSC 36 and GPMSC 46. Information stored at the HLR, therefore, similarly is accessible by such other network nodes.

The GPMSC 46 is, in turn, coupled to an NIM 52 which is also coupled to the Internet backbone 52. Packet data generated by the Internet host 12 is routed through the Internet backbone 22 and delivered to the GPMSC 46.

The PLMN further includes an SMS-C (short message service-center) 56. The SMS-C is operable to generate SMS (short message service) messages. The SMS-C 56 is functionally coupled to both the VPMSC 42 and the GMSC 36.

During operation of an embodiment of the present invention, packet data originated at the Internet host 12 to be terminated at the wireless station 14 is transmitted over the radio air interface to be terminated at the wireless station 14 only with the permission of the wireless station. Unsolicited, or otherwise unwanted, packets of data can be refused permission by the wireless station 14 to be transmitted by the PLMN 18 to the wireless station. An SMS message identifying the origination source, i.e., the identity of the Internet host 12, is first generated by the SMS-C 56 and caused to be transmitted over a control channel, in conventional fashion, to the wireless station 14. Responsive to reception at the wireless station of the SMS message, a determination is made as to whether to permit transmission of the packet data thereto. If permission is granted to the PLMN 18 to transmit the packet data to the mobile terminal, the mobile terminal registers to receive packet data.

The communication system 10 is exemplary of a PDC (personal digital cellular) communication system which provides PPDC (packet PDC) data communication over a radio link to a wireless station, here the wireless station 14. Mobility control for packet communications between, e.g., the Internet host 12 and the mobile terminal is performed in a network interface layer utilizing the MSN (mobile serial number) of the radio transceiver 26 of the mobile terminal 14. Mobility management functions, such as location registration and channel handover, are carried out in manners similar to the manners in which corresponding functions are carried out in circuit-switched communications.

The packet data originated by the Internet host 12 is headed by header information which identifies the wireless host 24 to which the packet data is to be routed. Conventionally, the packet of data originated by the Internet host 12 is routed over the Internet backbone 22 to the GPMSC 46. The GPMSC 46 translates the destination IP address identified in the header information of the packet data to a MSN associated with the radio transceiver 26 to which the wireless host 24 is coupled.

If there is an MSN which corresponds to the IP address, the GPMSC 46 then searches for the location of the radio transceiver 26 in a local HLR cache. If not found thereat, inquiry is made of the HLR 42 of the location, e.g., the cell or base station associated therewith, at which the radio transceiver 26 is registered to be located. In the exemplary illustration, the mobile terminal is registered to be located in an area is served by the VPMSC 44. The serving VPMSC 44 is identified, e.g., by a VPMSC area identifier (PAI).

Also, conventionally, the packet data is encapsulated, e.g., in a PMAP protocol, and forwarded from the GPMSC 46 to the serving VPMSC 44 which serves the addressed mobile terminal 36. The serving VPMSC de-capsulates the packet data and forwards the de-capsulated packet data to the radio transceiver 26 by way of the base station 32 over the radio link 16.

If the radio transceiver 26 is in a packet state, the packet is transmitted upon a user packet channel (UPCH) that is registered for the radio transceiver 26. If, conversely, the radio transceiver 26 is in a stand-by state, a packet paging message is forwarded to the VMSC 34 which serves the radio transceiver 26. And, the radio transceiver 26 is caused to be paged upon a paging channel.

If the radio transceiver 26 is paged, the page, transmitted upon a paging channel (PCH), subsequent to reception of the page, the radio transceiver 26 performs a packet communication registration with the VPMSC 44 on an available UPCH. Once the radio transceiver is successfully registered, the radio transceiver enters a packet state, and the packet data is forwarded from the VPMSC 44, to the base station 32, and over the radio link 16 upon the same UPCH used by the radio transceiver 26 for registration purposes.

When the radio transceiver 26 transmits data to be terminated at the Internet host 12, the VPMSC 44 receives the data. The data is encapsulated and forwarded to an appropriate GPMSC, here the GPMSC 46. The GPMSC 46 de-capsulates the received packet data and forwards the packet data to the external network, here the Internet backbone 22.

An embodiment of the present invention permits selection to be made at the wireless station 14 as to whether or not to permit the transmission of packet data thereto. If, for instance, the mobile terminal 26 is in a stand-by state, a decision can be made not to enter a packet state and to not permit the transmission of the packet data thereto.

Figure 2:
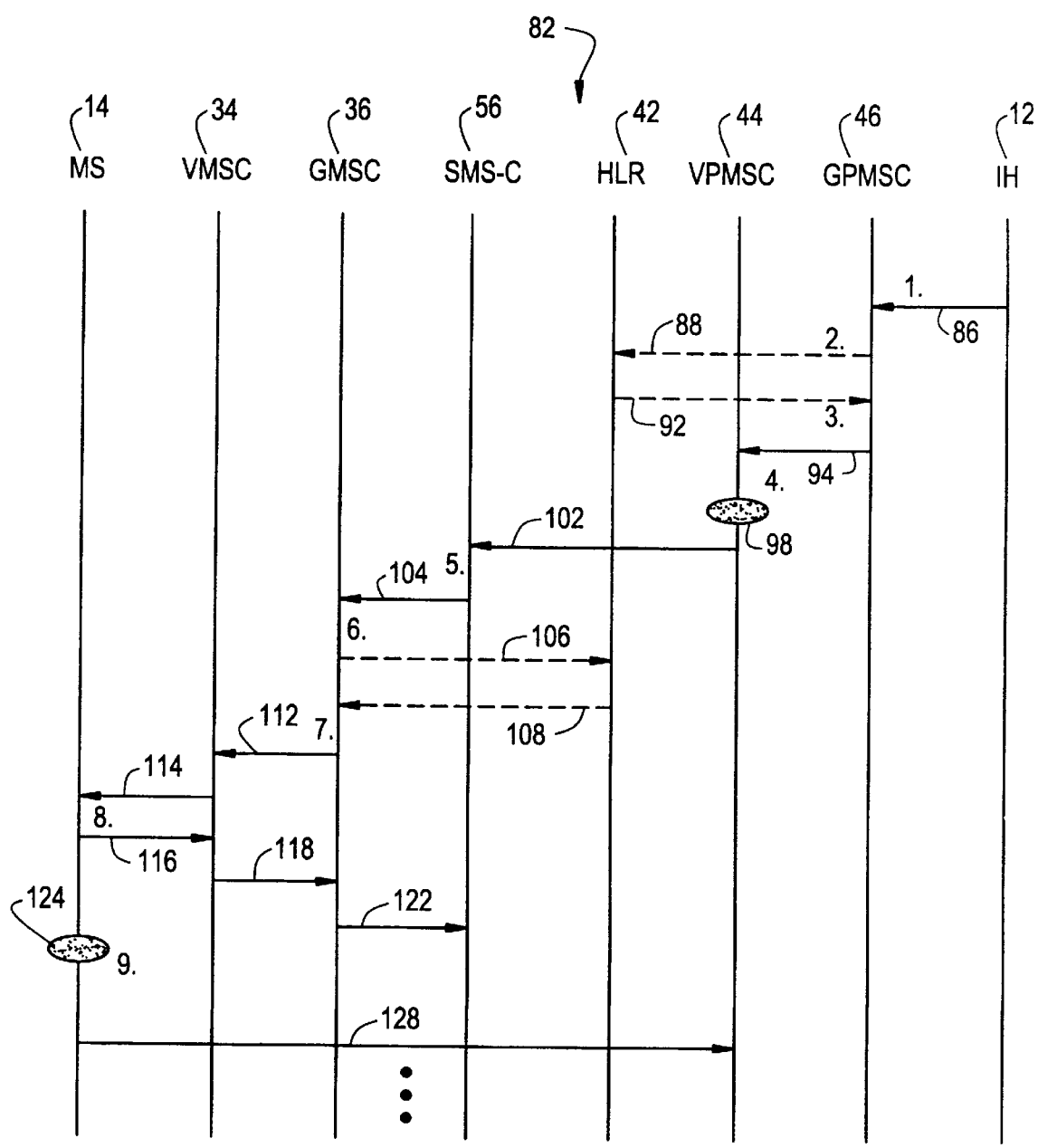
FIG. 2 illustrates a sequence diagram listing signal paths of signals generated during operation of an embodiment of the present invention.

FIG. 2 illustrates a sequence diagram, shown generally at 82, illustrating sequences of signal generation during operation of an embodiment of the present invention. Packet data generated by the Internet host 12 forming a portion of the communication system 10, shown in FIG. 1, is selectively routed to the mobile terminal 14 of the communication system.

First, and as indicated by the sequence segment 86, packet data originated at the Internet host 12 is routed by way of the Internet backbone 22 and received at the GPMSC 46. The packet data includes header information indicating the IP address associated with the wireless host 24 of the mobile terminal 14. The GPMSC translates the IP address associated with the wireless host 24 into an MSN associated with the radio transceiver 26 associated therewith. The location of the mobile terminal is then determined, first by interrogating a local HLR cache. If the location of the radio transceiver 26 cannot be determined by interrogating the local HLR cache, the HLR 42 is interrogated to determine the location of the radio transceiver, as indicated by the sequence segment 88. The registered location, stored at the HLR, is provided to the GPMSC, as indicated by the sequence segment 92.

The packet data is encapsulated, e.g., in a PMAP protocol by the GPMSC 46. And, the encapsulated data is forwarded, indicated by the sequence segment 94, by the GPMSC 46 to the VPMSC 44. The VPMSC 44 is the PMSC serving the addressed, mobile terminal.

The encapsulated data, received at the VPMSC 44, is de-capsulated, indicated by the activity block 98. The IP address of the wireless host 24 contained in the header information of the packet data is investigated. The VPMSC, for instance, performs a DNS (domain name search) to look up, for the source IP address, to obtain a host name and validate the service-type, e.g., FTP, Telnet, etc., for which the packet data transmission is intended. Responsive to the investigation, the packet data, including the source IP address, the host-name, and service-type, is forwarded, as indicated by the sequence segment 102, to the SMS-C 56. The information is forwarded using a conventional type of communication method, e.g., X.25 communications.

The SMS-C 56, in turn, issues an SMS message, indicated by the sequence segment 104, to the GMSC 36 in manners corresponding to conventional short message procedures.

The GMSC 36, in turn, interrogates, indicated by the sequence segment 106, the HLR 42 of the location of the radio transceiver 26. And, such information is provided, indicated by the sequence segment 108, to the GMSC 36. The SMS message is thereafter routed, indicated by the sequence segments 112 and 114 by the GMSC 36 via the VMSC 34 over the radio link 16 to the mobile terminal 14.

Once the radio transceiver 26 of the mobile terminal 14 receives the SMS message forwarded thereto, an acknowledgment of reception of the SMS message is returned, indicated by the sequence segments 116, 118, and 122 to the SMS-C 56 by way of the VMSC 34 and GMSC 36.

A determination is also made, indicated by the activity block 124, at the mobile terminal 14 whether to permit transmission of packet data originated by the Internet host 12, as identified in the SMS message, to the mobile terminal. When a determination is made to permit the transmission of the packet data, an indication of such permission is provided by the mobile terminal, indicated by the sequence segment 128 in which the radio transceiver initiates registration to enter into a packet state, pursuant to packet communication registration procedures. Thereafter, the packet data is routed to the mobile terminal 14.

Figure 3:
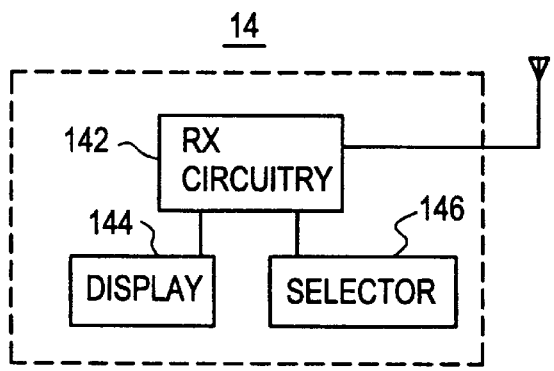
FIG. 3 illustrates a functional block diagram of a wireless station forming a portion of the communication system shown in FIG. 1.

FIG. 3 illustrates portions of the mobile terminal 14, shown previously in FIG. 1, operable in the communication system 10. The mobile terminal 14 includes receiver circuitry 142 for receiving, inter alia, SMS messages broadcast to the mobile terminal 14. The receiver circuitry 142 is representative of portions of the circuitry of the radio transceiver 26, shown in FIG. 1.

The mobile terminal 14 further includes a display element 144 and a selector 146. Both the display element and the selector 146 are coupled to the receiver circuitry 142. The display element 144 and the selector 146 are, in one embodiment, formed of portions of the radio transceiver 26, and, e.g., are formed of the display element of the mobile terminal and actuation keypad thereof, respectively. In another embodiment, the display element 144 and selector 146 form portions of the wireless host 24, e.g., the video display monitor and actuation keypad, respectively, of the wireless host.

When the SMS message indicating the originator of the packet data is received at the receiver circuitry 142, such identification is displayed upon the display element 144. A user of the mobile terminal determines, responsive to the displayed information, whether to permit transmission of the packet data to the mobile terminal 14. Selection of permission to receive the packet data is entered by way of the selector 146. When permission is granted to transmit the packet data to the mobile terminal 14, the mobile terminal 14 registers to receive packet data. Thereafter, the packet data is routed to the mobile terminal.

Figure 4:
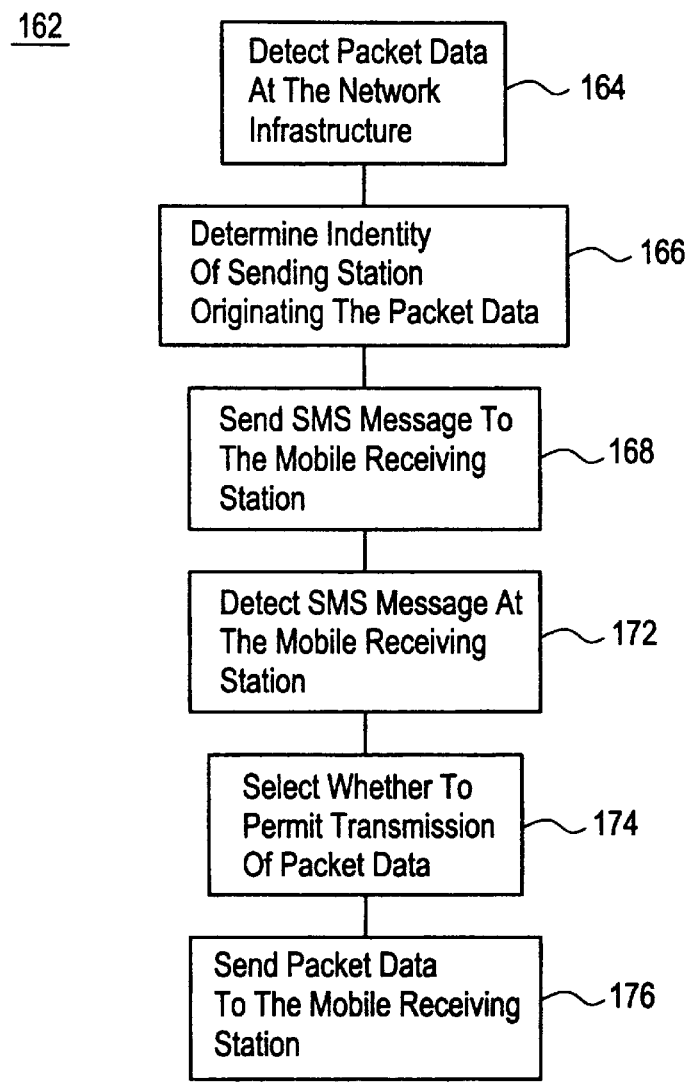
FIG. 4 illustrates a method flow diagram listing the method operation of an embodiment of the present invention.

FIG. 4 illustrates a method, shown generally at 162, of an embodiment of the present invention. The method selectively permits transmission of packet data to a mobile receiving station. The mobile receiving station is coupled by way of a radio interface to network infrastructure. And a sending station which originates the packet data is coupled to the network infrastructure.

First, and as indicated by the block 164, packet data originated by the sending station is detected at the network infrastructure. Then, and as indicated by the block 166, the identity of the sending station from which the packet data originates is determined. An SMS message is formed which indicates the identity of the sending station. The SMS message is sent, as indicated by the block 168, to the mobile receiving station.

The SMS message is detected at the mobile receiving station, as indicated by the block 172. Selection is then made, as indicated by the block 174, whether to accept transmission of the packet data originated by the sending station. And, the packet data is sent to the mobile receiving station, indicated by the block 176, if the transmission is accepted at the mobile receiving station.

Thereby, packet data is transmitted to the mobile terminal only with the permission of the mobile terminal. Transmission of undesired, or otherwise unsolicited, packet data is selectably prevented at the mobile terminal by denying permission to transmit the packet data thereto. The user of the mobile terminal is able to control, thereby, which packets of data are transmitted to the mobile terminal. Costs associated with the transmission of the packets of data to the mobile terminal are thereby also able to be controlled.

The previous descriptions are of preferred examples for implementing the invention, and the scope of the invention should not necessarily be limited by this description. The scope of the present invention is defined by the following claims.

What is claimed is:

1. In a method for communicating packet data between a sending station and a mobile receiving station in a radio communication system, the mobile receiving station coupled by way of a radio interface to network infrastructure, the sending station coupled to the network infrastructure, and the radio interface including a short message channel and a packet channel, an improvement of a method for selectively permitting transmission of the packet data to the mobile receiving station, said method comprising the steps of:

detecting at the network infrastructure the packet data originated by the sending station;

determining at the network infrastructure an identity of the sending station from which the packet data originates;

sending, by way of the short message channel, an indication of the identity of the sending station determined during said step of determining to the mobile receiving station;

detecting, at the mobile receiving station, the indication of the identity of the sending station sent by way of the short message channel during said step of sending;

selecting, at the mobile receiving station, whether to accept transmission of the packet data originated by the sending station responsive to the indication of the identity of the sending station detected at the mobile receiving station; and sending, by way of the packet channel, the packet data to the mobile receiving station if the transmission is accepted at the mobile receiving station during said step of selecting.

2. The method of claim 1 wherein the packet data originated by the sending station includes a header portion, the header portion including an address of the mobile receiving station at which the packet data is to be terminated, wherein the network infrastructure includes a database for storing data, indexed against the address of the mobile receiving station, at which the mobile receiving station is last-registered to be located, and wherein said method comprises the further step of, subsequent to said step of detecting the packet data originated at the sending station, of:

interrogating the database by a GPMSC (gateway packet data mobile switching center) to determine an area at which the mobile receiving station is last-registered to be located.

3. The method of claim 2 wherein the radio communication system comprises a cellular communication system having at least the GPMSC and a VPMSC (visited packet data mobile switching center), wherein the database comprises an HLR (home location register), wherein the packet data detected at the GPMSC, wherein the HLR is interrogated to determine the area at which the mobile receiving station is last-registered, and wherein the method comprises the additional step of forwarding the packet data to the VPMSC if the mobile receiving station is determined to be last-registered in an area encompassed by the VPMSC.

4. The method of claim 3 comprising the additional step, prior to the step of forwarding the packet data, of encapsulating the packet data according to a selected protocol.

5. The method of claim 4 comprising the additional step of de-encapsulating the packet data at the VPMSC.

6. The method of claim 5 wherein the cellular communication system further comprises a SMS-C (short message service center) and wherein the indication of the identity of the sending station sent during said step of sending the indication of the identity of the sending station is generated by the SMS-C as a short message.

7. The method of claim 6 comprising the additional step of providing the packet data to the SMS-C.

8. The method of claim 7 wherein the cellular communication system further includes a GMSC (gateway mobile switching center) comprising the additional step of forwarding the short message forming the indication of the identity of the sending station to the GMSC.

9. The method of claim 8 comprising the additional step of interrogating the HLR by the GMSC to determine the area at which the mobile station is last-registered to be located.

10. The method of claim 9 wherein the cellular communication station further comprises a serving MSC (mobile switching center) other than the GMSC and wherein the method comprises the additional step of forwarding the short message forming the indication of the identity of the sending station to the serving MSC when the serving MSC is other than the GMSC.

11. The method of claim 1 comprising the additional step of acknowledging detection at the mobile receiving station of detection, during said step of detecting at the mobile receiving station, the indication of the identity of the sending station.

12. The method of claim 11 comprising the additional step, prior to said step of sending the packet data to the mobile receiving station, of registering the mobile receiving station with the network infrastructure if the mobile receiving station is in the standby state.

13. In a radio communication system for communicating packet data between a sending station and a mobile receiving station, the mobile receiving station coupled by way of a radio interface with network infrastructure, the radio interface including a short message channel and a packet channel, and the sending station coupled to the network infrastructure by way of a packet data connection, an improvement of apparatus for selectively permitting transmission of the packet data to the mobile receiving station, said apparatus comprising:

a packet data detector for detecting at the network infrastructure the packet data originated by the sending station;

an identifier operable responsive to detection by said packet data detector of the packet data, said identifier for determining an identity of the sending station from which the packet data detected by said packet data detector originates;

an SMS-center (short message service-center) coupled to receive indications of the identity of the sending station identified by said identifier, said SMS-center for generating an SMS message for transmission to the mobile receiving station identifying the identity of the sending station originating the packet data to be terminated at the mobile receiving station; and a packet data transmitter coupled to receive the packet data originated by the sending station and an indication of acceptance by the mobile receiving station of transmission of the packet data thereto, said packet data transmitter for transmitting the packet data to the mobile receiving station responsive to reception of the indication of acceptance by the mobile receiving station.

14. The apparatus of claim 13 further comprising an SMS receiver positioned at the mobile receiving station, said SMS receiver for detecting the SMS message generated by said SMS-center and identifying the identity of the sending station.

15. The apparatus of claim 14 further comprising a selector coupled to said SMS receiver, said selector permitting selection, responsive to reception at said SMS receiver of the SMS message, whether to select transmission of the packet data originated at the sending station.

16. The apparatus of claim 15 wherein said selector is user-actuable.

17. In a radio communication system for communicating packet data between a sending station and a mobile receiving station, the mobile receiving station coupled by way of a radio interface with network infrastructure, the radio interface including a short message channel and a packet channel, and the sending station coupled to the network infrastructure by way of a packet data connection, a combination with the mobile receiving station of apparatus for selectively permitting transmission of the packet data to the mobile receiving station, said apparatus comprising:

an SMS (short message service) receiver for detecting an SMS message identifying the sending station which originates the packet data; and a user-actuable selector coupled to receive indications of the SMS message received by said SMS receiver, said user-actuable selector for selecting whether to permit transmission of the packet data originated at the sending station.

18. A method in a communications system for selectively receiving packet data at a terminal, comprising the steps of:

providing packet data at a network infrastructure, the packet data being associated with a related attribute;

sending an indication of the related attribute to the terminal;

determining at the terminal whether to accept transmission of the packet data to the terminal based, at least in part, on the indication of the related attribute;

transmitting to the network infrastructure from the terminal an indication of acceptance of the packet data if it is determined to accept transmission of the packet data in said step of determining; and transmitting from the network infrastructure to the terminal the packet data if the indication of acceptance of the packet data is received at the network infrastructure.

19. The method of claim 18 wherein the terminal comprises a mobile receiving station and the network infrastructure comprises a wireless network infrastructure.

20. A method in a communications system for selectively receiving packet data at a terminal, comprising the steps of:

providing packet data at a network infrastructure, the packet data being associated with a related attribute;

sending an indication of the related attribute to the terminal;

determining at the terminal whether to accept transmission of the packet data to the terminal based, at least in part, on the indication of the related attribute;

transmitting to the network infrastructure from the terminal an indication of acceptance of the packet data if it is determined to accept transmission of the packet data in said step of determining;

transmitting from the network infrastructure to the terminal the packet data if the indication of acceptance of the packet data is received at the network infrastructure; and wherein said step of determining at the terminal whether to accept transmission of the packet data to the terminal based, at least in part, on the indication of the related attribute is performed, at least partially, by a user of the terminal.

21. The method of claim 18 wherein said step of providing packet data at a network infrastructure comprises the step of forwarding the packet data over the Internet.

22. The method of claim 18 further comprising the steps of encapsulating the packet data in a PMAP (packet Mobile Application Part) protocol to produce encapsulated packet data and transferring the encapsulated packet data internally within the network infrastructure.

23. The method of claim 18 wherein said step of sending an indication of the related attribute to the terminal comprises the step of sending an SMS (short message service) message over an SMS channel.

24. The method of claim 18 wherein said step of transmitting to the network infrastructure from the terminal an indication of acceptance of the packet data comprises the step of transmitting the indication of acceptance to the network infrastructure from the terminal over a packet data channel.

25. The method of claim 18 wherein said step of transmitting from the network infrastructure to the terminal the packet data comprises the step of transmitting the packet data to the terminal from the network infrastructure over a packet data channel.

26. The method of claim 18 wherein the indication of the related attribute comprises at least one of an originating source and a service.

27. The method of claim 26 wherein the originating source comprises at least one of an IP (Internet Protocol) address and a host name.

28. The method of claim 26 wherein the service comprises at least one of advertising information, FTP (file transfer protocol), and telnet.

* * * * *